June 11, 1957 C. B. DALE 2,795,428

SWITCH MECHANISM FOR PHONOGRAPH RECORD CHANGERS

Filed May 11, 1951 3 Sheets-Sheet 1

INVENTOR.
Colin B. Dale
BY
Banning & Banning
Attys.

June 11, 1957 C. B. DALE 2,795,428

SWITCH MECHANISM FOR PHONOGRAPH RECORD CHANGERS

Filed May 11, 1951 3 Sheets-Sheet 2

INVENTOR.
Colin B. Dale
BY Banning & Banning
Attys.

SWITCH MECHANISM FOR PHONOGRAPH RECORD CHANGERS

Filed May 11, 1951

INVENTOR.
Colin B. Dale
BY
Dawson & Dawson
Attys.

United States Patent Office 2,795,428

Patented June 11, 1957

2,795,428

SWITCH MECHANISM FOR PHONOGRAPH RECORD CHANGERS

Colin B. Dale, Oak Park, Ill., assignor to Webster-Chicago Corporation, Chicago, Ill., a corporation of Illinois Application May 11, 1951, Serial No. 225,712

4 Claims. (Cl. 274—1)

This invention relates to a switch mechanism for automatically controlling the starting and stopping operation of a motor used with a phonograph record changer.

The main objects of this invention are to provide an improved form of switch mechanism for controlling the starting and stopping of the electric motor for a phonograph turntable; to provide an improved motor-control switch mechanism the functioning of which is determined by the relative positions of the tone arm and the switch mechanism; to provide an improved tone arm-actuated motor-control switch mechanism of this kind which functions for either the manual or the automatic operation of the phonograph; and to provide an improved motor-control switch mechanism of this kind which is simple in construction, hence economical to manufacture, and which may be readily attached to many of the standard types of phonograph presently on the market but which have been using a different form of motor-control switch mechanism.

Figure 2:
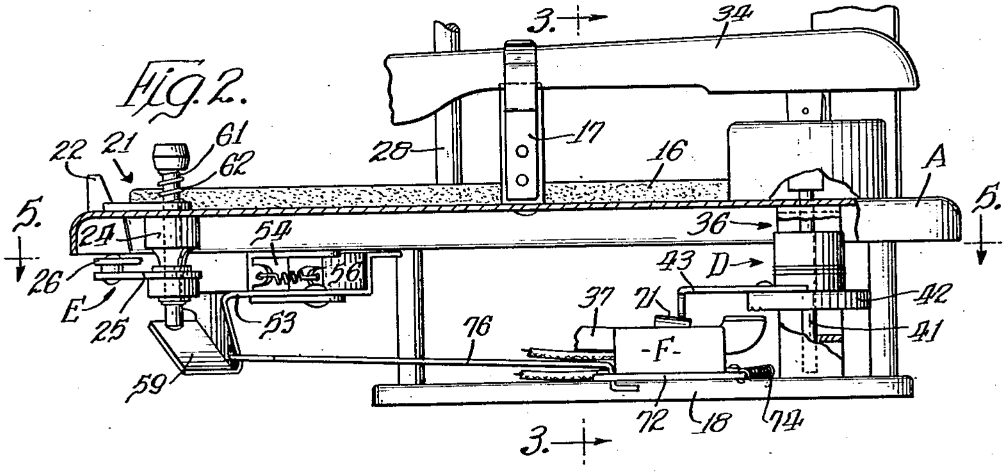
Fig. 2 is a side elevation of the same, partly in section showing the tone arm mounting in contact with the switch mechanism whereby the turntable motor circuit is open.
Figure 3:
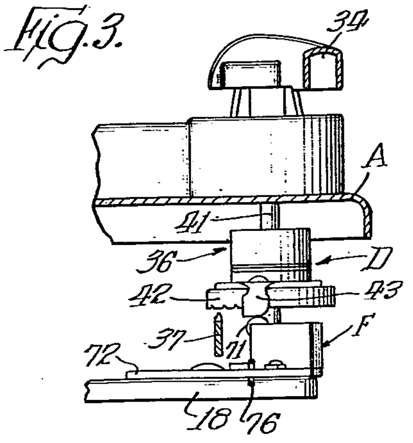
Fig. 3 is a transverse sectional detail, taken on line 3—3 of Fig. 2.
Figure 4:
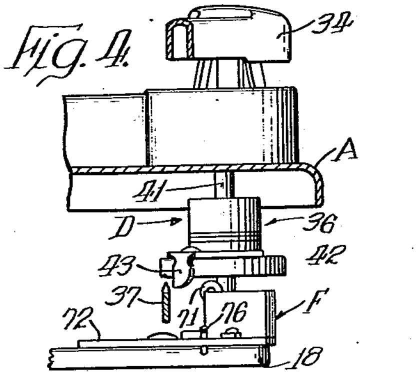
Figure 5:
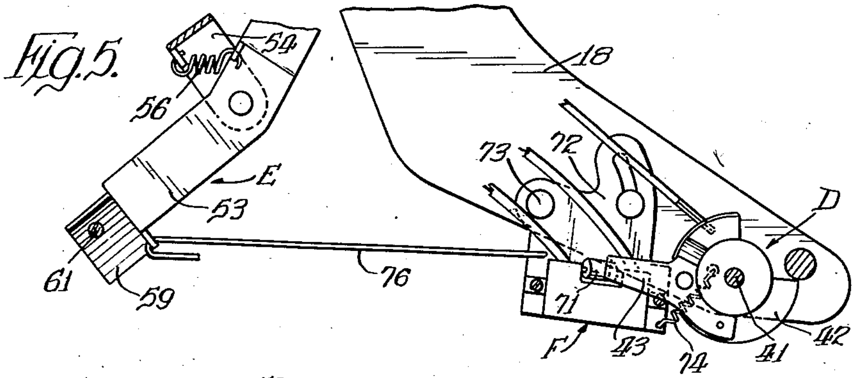
Figure 6:
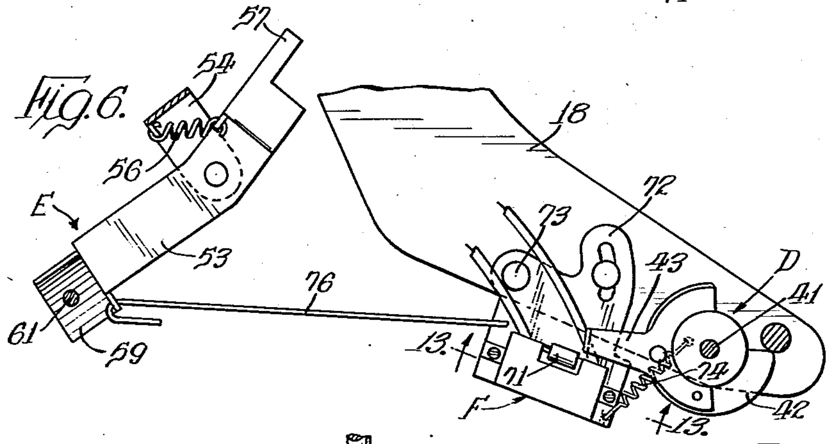
Figure 7:
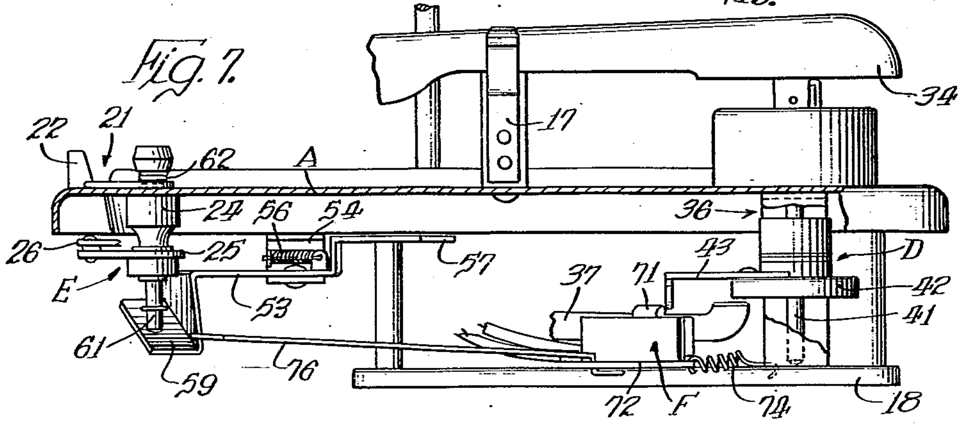
Figure 8:
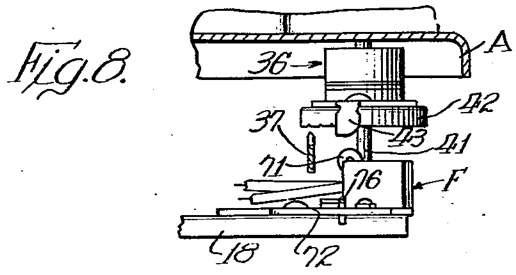
Figure 9:
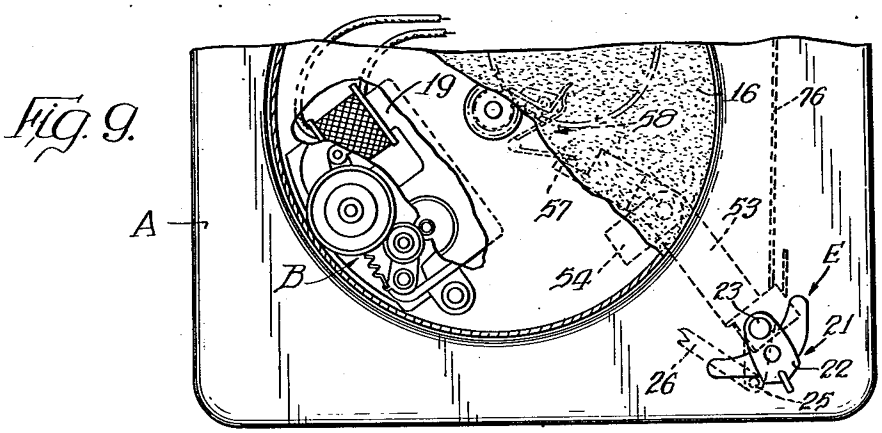
Figures 10, 11, 12, 13:
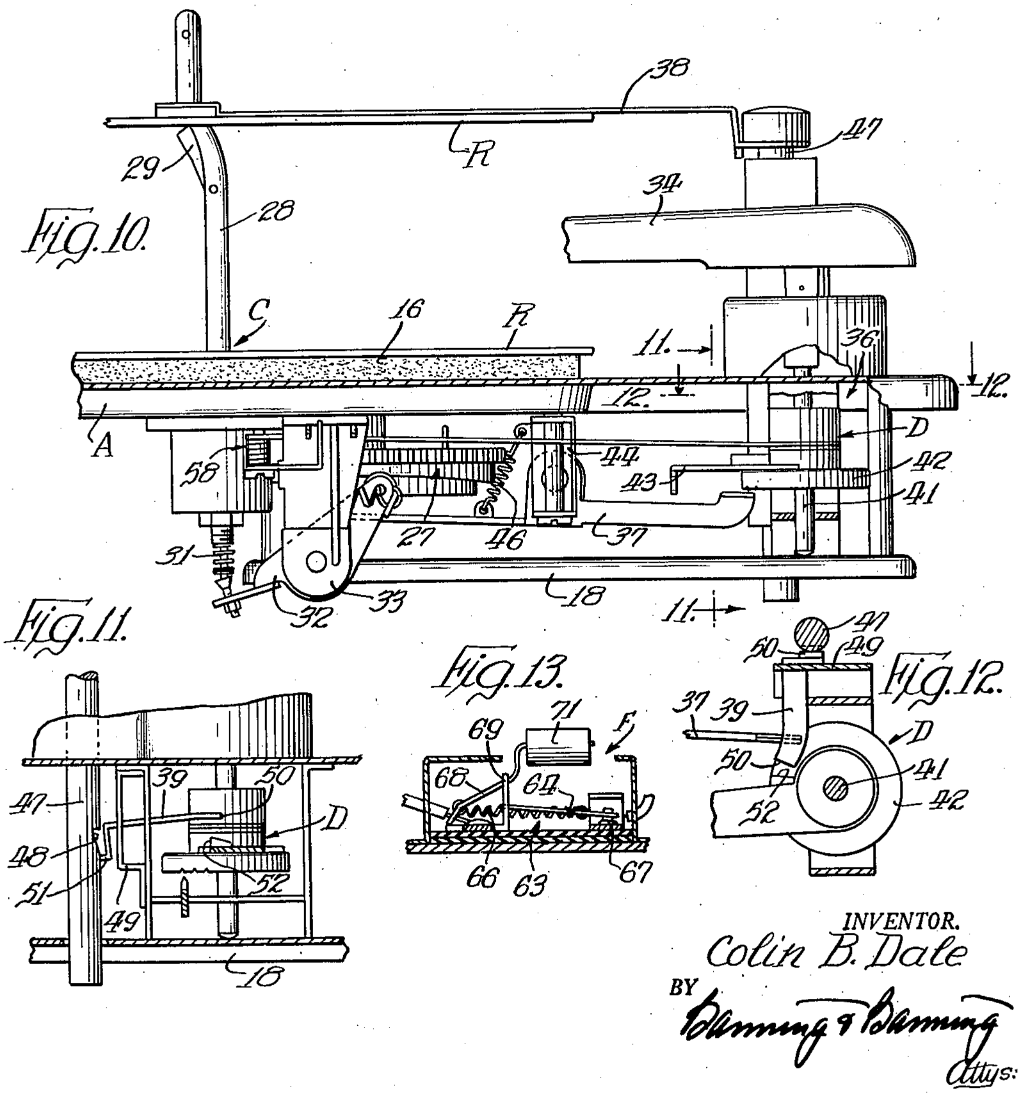

Fig. 4 which is a view similar to Fig. 3 shows the tone arm mounting shifted out of contact with the motor-control switch mechanism;

Fig. 5 is a plan view of the motor-control switch mechanism as viewed from the plane of line 5—5 of Fig. 2;

Fig. 6 is a similar view, but showing the shifted position of the motor-control switch as effected by the action of the record-reject lever;

Fig. 7 which is a view similar to Fig. 2 shows the motor-control switch mechanism and record-reject pin and lever in their shifted positions, as indicated in Fig. 6;

Fig. 8 which is a view similar to Figs. 3 and 4 shows how the tone arm actuating lever maintains the tone arm mounting elevated to prevent action of the motor-control switch mechanism when the record changer is being automatically operated;

Fig. 9 is a plan view on a reduced scale of the record changer with portions broken away to more clearly show the motor and multi-speed turntable drive, and also the record-reject lever;

Fig. 10 is a side elevation, partly in section, of the tone arm positioning and restraining mechanism and the record-support and release mechanism;

Fig. 11 is a sectional detail, taken on line 11—11 of Fig. 10;

Fig. 12 is a sectional detail, taken on line 12—12 of Fig. 10; and

Fig. 13 is a sectional detail of the switch mechanism, taken on line 13—13 of Fig. 6.

A major feature of this invention involves a switch mounted adjacent the tone arm whereby the motor is always cut off when the tone arm is in rest position, but is started instantly by the change in the relative positions of the switch mechanism and the tone arm, as effected either by the manual shifting of the tone arm or by the record-reject means.

A phonograph of the record changer type, for use with which the present motor-control switch mechanism F is especially designed, comprises the usual supporting base A whereon is mounted a multi-speed turntable drive B, a record-support and release mechanism C, a tone arm positioning and restraining mechanism D, and a record-reject means E.

The supporting base A which may be of usual construction, is in the form of a flanged plate having a depression wherein the turntable 16 is rotatably mounted. At one side of the base A is arranged a tone arm rest 17. From the underside of the base A, adjacent one corner, is suspended a subbase 18 whereon is mounted the hereinafter described motor-control switch mechanism F embodying this invention. Also suspended from the base A is a motor 19 forming a part of the multi-speed turntable drive B.

Figure 1:
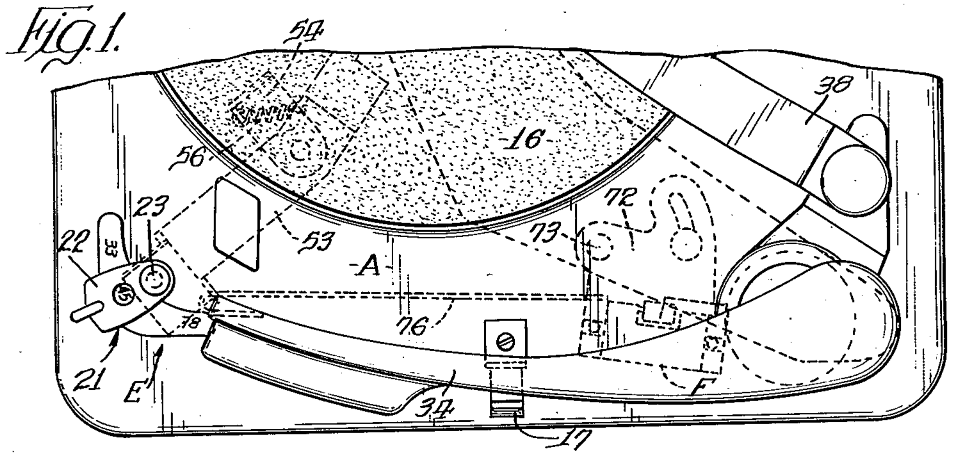
Figure 1 is a partial plan view of a conventional record changer phonograph whose tone arm is shown in rest position, a motor-control switch mechanism constructed in accordance with this invention being indicated in dotted outline.

The turntable 16 may be of usual construction and is driven by the motor 19 at one of three speeds which is determined by shifting of the speed selector 21. This speed selector comprises an arm 22 pivoted at 23 so as to swing between a neutral or "off" position and any one of three other positions suitably marked by the numerals "33," "45," and "78," as indicated in Fig. 1. The arm 22 is connected by a sleeve (not shown), journaled in a hub 24 (see Fig. 2), to an arm 25 to which is connected a link 26 leading to the multi-speed drive B arranged between the motor 19 and the turntable 16.

The record-support and release means C forms no part of this invention. It may comprise any suitable means operable by an intergrated gear and cam means 27 for effecting release of records one at a time for gravity descent onto the turntable 16. As hereinshown, this means comprises a spindle 28 on which the records R are supported and mounting a kicker 29 which is operated by a spring-biased push rod 31 through a spring-biased rocker arm 32 pivoted to a bracket 33 and actuated, in the well-known manner, by the gear and cam means 27.

The tone arm positioning and restraining mechanism D comprises a tone arm 34, a mounting 36, an actuating lever 37, and an overarm 38 which controls the functioning of a detent 39.

The tone arm 34 which may be of conventional construction, is hingedly attached to the mounting 36. This mounting, as herein shown, comprises a shaft 41 arranged on the main base A and subbase 18 for rotative and axial movement by the lever 37, as will be described presently. Adjacent its lower end, the shaft 41 carries a fixed disc 42 with which the actuating lever 37 coacts to secure the required axial and rotative movements of the shaft 41. The disc 42 mounts an arm 43 having a depending contact finger 45 which coacts with the motor-control switch F presently to be described.

The lever 37 is mounted on a swiveled bracket 44 for horizontal and vertical movement. A spring 46 normally urges the lever 37 to hold the follower pin thereon in contact with the cam of the gear and cam means 27. During a single rotation of the cam the upturned end of the lever 37 is caused to engage the disc 42 and effect the axial and rotative movement of the shaft 41. This secures the required swinging of the tone arm 34 between its starting position on the rest 17 and the beginning-of-play position on a record and back to that starting position after the finish of play of a last record.

The overarm 38 is mounted on a post 47 slidably and rotatively mounted adjacent the tone arm shaft 41 so that the overarm 38 may be positioned over the uppermost reserve record R (see Fig. 10). The post 47 is recessed at 48 (see Fig. 11) to coact with the detent 39. This detent is hinged on a plate 49 so that its acting end 50 is movable into and out of position to engage a shoulder 52 (see Figs. 11 and 12) on the disc 42 for restraining rotation of the tone arm 34 in a clockwise direction after playing of the last record. The hinge of the detent 39 is so positioned that the detent is weighted to urge its acting end 50 into the path of the shoulder 52. However, the opposite end 51 of the detent is formed to engage the periphery of the post 47 and thereby be held to retract the acting end 50 from the path of the shoulder 52.

The record-reject means E comprises a lever 53 swingably mounted on a bracket 54 (see Fig. 2) on the underside of the main base A. This lever is biased by a spring 56 to retract a finger 57 (see Figs. 6 and 9) on the inner end thereof from engagement with a tripper means 58, thereby activating the gear and cam means 27 for operating the tone arm actuating lever 37 in a manner that is well known in phonograph record changers. At its outer end the lever 53 is formed with an angular offset constituting a cam 59 whereby a depressible pin 61 effects the required swinging of the lever 53 against the action of the spring 56. The pin 61 is slidably mounted in a hub 24 secured to the underside of the main base A. A spring 62 normally retracts this reject pin 61 upwardly.

The motor-control switch mechanism F embodying this invention comprises a conventional snap-action, light-pressure, precision switch 63 of the micro type having an arm 64 which is oppositely actuated by an overcenter spring 66 to open and close contacts 67 (see Fig. 13) installed in an electrical circuit leading to the motor 19. A lever 68 is hinged at 69 with one end connected to the spring 66, its other end mounting a hub 71. The switch 63 is fixed on a rocker arm 72 hinged at 73 on the subbase 18. A spring 74 (see Figs. 2, 5 and 7) normally shifts the rocker arm 72 so that when the tone arm mounting 36 is lowered, with the tone arm 34 in rest position, the finger 45 at the end of the arm 43 contacts the hub 71 (see Figs. 2, 3 and 5) near its adjacent end. When the rocker arm 72 is retracted to the position shown in Figs. 6 and 7, the adjacent end of the hub 71 is then displaced laterally out of position for depression by the finger 45. Accordingly, the spring-biased lever 68 mounting the hub 71 is elevated so that the end of the hub is above the level of the finger 45 (see Fig. 7). When the spring 74 returns the rocker arm 72 to normal position, after being shifted away therefrom, the end of the hub 71 abuts the finger 45 at the end of the arm 43 and the switch 63 is held from returning to such normal position until after the tone arm 34 has been swung to retract the mounting arm finger 45 from the path of the hub 71. Swinging of the rocker arm 72 is effected by a link 76 connected to the reject lever 53.

Whenever the switch-arm lever-hub 71 is contacted by the mounting arm finger 45, the resulting shift of the switch arm 64 opens the circuit to shut off current to the turntable motor 19. As soon as the mounting arm finger 45 and the switch-arm hub 71 are disengaged, the switch arm 64 will be actuated by the spring 66 to close the circuit to the motor 19 which will then continue to operate until the switch-arm lever-hub 71 is again depressed by the arm 43.

Such a switch mechanism is effective to control the turntable motor 19 for either manual or automatic operation of the phonograph. When the phonograph is manually operated, no reserve records R are supported on the spindle 28. Accordingly, lowering of the post 47 registers the recess 48 with the end 51 of the detent 39 so that the detent end 50 is free to engage the shoulder 52 on the tone arm mounting disc 42 and prevent the tone arm 34 from being swung from its rest position by the actuating lever 37. After placing a record on the turntable 16, the tone arm 34 may be swung manually into the beginning-of-play position for that one record. Such a swing of the tone arm 34 moves the mounting arm finger 45 out of contact with the switch-arm lever-hub 71, thereby releasing the switch arm 63 and restoring the current to the turntable motor 19. By the time that the needle is positioned on the record R the turntable 16 will be up to speed. Incidental to placing the record R on the turntable 16, the speed-selector arm 22 will have been shifted to cause a subsequent rotation of the turntable 16 at the requisite speed.

At the finish of play of the record, when manually operated, the tone arm 34 is manually returned to its rest position on the post 17. When this rest position is reached, the finger 45 at the end of the mounting arm 43 contacts and depresses the switch-arm lever-hub 71 thereby cutting off current to the turntable motor 19.

When the phonograph, equipped with this motor-control mechanism is to be automatically operated, a supply of reserve records are first placed on the spindle 28 to be there held by the record-support and release means C. As a consequence, the overarm 38 elevates the post 47 retracting the detent 39 so as to free the tone arm mounting 36 for rotative movement.

The speed-selector arm 22 having been set for the requisite turntable speed for successive play of the records, when released from the record support and release means C, the reject pin 61 is then depressed. The contact with the cam 59 effects a swing of the lever 53 and the rocker arm 72. The swing of the rocker arm withdraws the switch-arm lever-hub 71 from engagement with the mounting arm finger 45. Immediately the turntable motor starts to operate. The swing of the lever 53 actuates the tripper means 58 (see Fig. 9) to effect a rotation of the gear and cam means 27 with a consequent release of a record R onto the turntable 16.

It should be noted that even if the depression of the reject lever pin 61 be ever so rapid, the hub 71 will be withdrawn from its depressed position under the finger 45 of the arm 43. Therefore if the tone arm 34 does not start to move instantly out of rest position, it cannot effect a cutoff of the turntable motor 19, since the end of the switch-arm lever hub 71 will be above the level of the finger 45 at the end of the arm 43. Hence, as the rocker arm 72 is urged toward its normal position by the spring 74, the end of the hub 71 will abut the fingers 45 at the end of the arm 43 and the motor circuit will remain closed awaiting its later retraction by the arm 43.

So long as there are reserve records on the spindle 28 the tone arm 34 will swing back from the finish-of-play position to a point above rest position and immediately back to the beginning-of-play position for the record next awaiting play. Accordingly there will be no lowering of the arm 43 to affect the snap-action switch 63 when the tone arm 14 is passing through a point above rest position. However, after release of the last reserve record from the spindle 28, lowering of the post 47 will bring the recess 48 into registration with the end 51 of the detent 39 and free the detent to engage its end 50 with the shoulder 52 so as to subsequently restrain the rotation of the disc 42. Thus, the arm 43 will be poised over the switch-arm lever-hub 71 until the actuating lever 37 is moved to free its contact with the tone arm mounting disc 42, whereupon its depression will cause the arm 43 to come to rest upon the end of the switch-arm lever-hub 71 thereby cutting off the current to the turntable motor 19.

I claim:

1. A phonograph comprising a supporting base, a motor-driven turntable rotatably journaled on the base, a tone arm, a mounting swingably supporting the tone arm on the base for movement from and to a position of rest, a micro type switch mounted for bodily swinging movement on the base having a control circuit switch arm, means normally urging the switch to dispose its circuit-control switch arm in position to be depressed by the tone-arm mounting when the tone arm is in its rest position for opening the circuit to the turntable motor, and manual means for bodily swinging the switch out of engagement with said tone arm mounting to release the switch arm and close the circuit to the motor in advance of the tone arm moving out of rest position by lateral displacement of said switch, said tone arm having means fixedly secured thereto for engaging said switch to effect said opening of said circuit in said rest position and for releasing said switch upon movement out of said rest position selectively.

2. A phonograph comprising a supporting base, a motor-driven turntable rotatably journaled on the base, a tone arm, a mounting swingably supporting the tone arm on the base for movement from and to a position of rest, a rocker arm hinged on the base adjacent the tone arm mounting, a switch having a circuit control switch arm fixed on the rocker arm with its circuit-control switch arm normally actuated for closing the circuit to the turntable motor, means urging the rocker arm to a position in which the switch arm is depressed by the tone arm mounting when the arm is in its rest position for opening the circuit to the motor, means for shifting the rocker arm from said position to a retracted position, and other means on the tone arm mounting for holding the rocker arm in its retracted position until the tone arm has been moved from its rest position.

3. A phonograph comprising a supporting base, a motor-driven turntable rotatably journaled on the base, a tone arm, a mounting swingably supporting the tone arm on the base for movement from and to a position of rest, a rocker arm hinged on the base adjacent the tone arm mounting, a switch having a circuit control switch arm fixed on the rocker arm with its circuit-control switch arm normally actuated for closing the circuit to the turntable motor, means for urging the rocker arm to a position in which the switch arm is depressed by the tone arm mounting when the arm is in its rest position for opening the circuit to the motor, a normally retracted record-reject member hinged on the base, and a link connecting the record-reject member with the rocker arm whereby the actuation of the record-reject member shifts the rocker arm to retract the switch from said position in which the switch arm is depressed by the tone arm mounting.

4. A phonograph comprising a supporting base, a motor-driven turntable rotatably journaled on the base, a tone arm, a mounting swingably supporting the tone arm on the base for movement from and to a position of rest, a rocker arm hinged on the base adjacent the tone arm mounting, a switch having a circuit control switch arm fixed on the rocker arm with its circuit-control switch arm normally actuated for closing the circuit to the turntable motor, means for urging the rocker arm to a position in which the switch arm is depressed by the tone arm mounting when the arm is in its rest position for opening the circuit to the motor, a normally retracted record-reject member hinged on the base, a link connecting the record-reject member with the rocker arm whereby the actuation of the record-reject member shifts the rocker arm to retract the switch from said position in which the switch arm is depressed by the tone arm mounting, and means on the tone arm mounting for holding the rocker arm in its retracted position until the tone arm has been moved from its rest position.

References Cited in the file of this patent

UNITED STATES PATENTS

| | | |
|---|---|---|
| 2,333,414 | De Tar | Nov. 2, 1943 |
| 2,484,775 | Zandelin et al. | Oct. 11, 1949 |
| 2,541,072 | Jones | Feb. 13, 1951 |
| 2,545,643 | Bender | Mar. 20, 1951 |
| 2,596,016 | Falk | May 6, 1952 |

FOREIGN PATENTS

| | | |
|---|---|---|
| 429,635 | Great Britain | June 4, 1935 |